Figure 1:
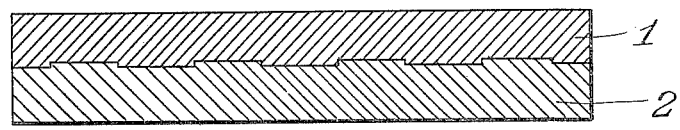

J. W. AYLSWORTH.
PRINTING PLATE.
APPLICATION FILED OCT. 28, 1913.

1,098,610.

Patented June 2, 1914.

Witnesses:
S. M. Baeder
Josephine N. Kesler

Inventor
J. W. Aylsworth
By his Attorney
Dyer Smith

UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

PRINTING-PLATE.

1,098,610.  Specification of Letters Patent.  Patented June 2, 1914.

Continuation in part of application Serial No. 579,585, filed August 29, 1910. This application filed October 28, 1913. Serial No. 797,769.

*To all whom it may concern:*

Be it known that I, JONAS W. AYLSWORTH, a citizen of the United States, residing in East Orange, county of Essex, State of New Jersey, have invented certain new and useful Improvements in Printing-Plates, of which the following is a description.

My invention has for its object the production of printing or embossing plates made of, or having a surface layer of, a material not heretofore used for this purpose, namely, a phenolic condensation product. By my invention the printing surfaces are formed on the surface of a plate or block formed of a phenolic condensation product or a plate or block having a surface layer of a phenolic condensation product formed thereon. Various important advantages accrue from the use of this material and the practice of the process to be described in making the plates, as will be more fully described hereafter. Preferably the printing plate is formed with a body portion of a permanently fusible material, and surface layers, thereon of an infusible but plastic-when-hot phenolic condensation product, as will be described.

The object of my invention comprises the production of such plates as are above referred to, as new articles of manufacture, and the devising of a novel process for the production of the same.

The present application is a continuation as to certain features thereof, of my pending application, Serial No. 579,585, filed August 29, 1910, entitled "Production of matrices." In the said application I originally disclosed the production of a novel matrix for stereotyping processes, and also the production of a novel printing or embossing working plate. The said matrix was formed of a phenolic condensation product, as described, and was stated to have properties which adapt it to be used for the production of a large number of duplicate printing or embossing working plates which may be used for printing or embossing either the coarsest letters or designs or the finest photo-engravings, designs, etc. The matrix as described was capable of forming printing plates of phenolic condensation products as described herein, or of other material, and similarly the plate described herein is adapted to be formed in the matrix described in my application referred to, or in a matrix formed of other suitable material. The subject matter of my said application relating to printing or embossing plates was divided therefrom and, with a somewhat fuller description, including additional matter, constitutes the subject matter of the present case.

Briefly described, my improved printing plate in its preferred form is formed of, or has a surface layer formed of, an infusible condensation product of a phenol and a substance containing the methylene radical $CH_2$, such as hexa-methylene-tetra-amin, together with a substance which I term a plasticity or solid solvent ingredient. This composition is very hard and refractory, will not corrode or deteriorate, is non-inflammable, will not be affected by ordinary chemical agents, and reproduces even the finest lines of an engraving with great exactness. The composition also is infusible, but, because of the presence therein of the plasticity agent referred to, has the property of becoming sufficiently plastic when heated to the temperature at which the impression of the matrix is made thereon, to take the required impression. The printing plate is made by pressing a suitable matrix into or against the composition of which the plate is to be formed when the latter is in plastic condition.

In its simplest form my improved plate is formed as a whole of the infusible but hot-plastic composition described. In its preferred form, however, this composition forms a surface layer upon a body of a permanently fusible composition, the surface layer preferably being cemented or formed on both faces of the plate. The body composition may be a phenol or cresol resin, a shellac composition or gum like copal, asphaltum, or other suitable fusible composition, compounded with a large percentage of wood pulp or other filler, to make the body sufficiently stiff. The function of the fusible body is chiefly to relieve strains in the plate because of the formation on the surface thereof of the printing or embossing lines, surfaces or designs. For this purpose it is sufficient that the body composition be fusible and plastic during the formation of the impression on the plate from the matrix. Thus the body composition may be a mixture of ingredients, such as a fusible phenol resin and a methylene-containing hardening agent, which will react during the taking of the impression from the matrix, or on subsequent heat treatment, to form an infusible product. If, however, the body composition is of a permanently fusible composition, as indicated, the printing plate can readily have its printing surface blanked out or obliterated, at any desired time, by heat and pressure, and a fresh impression made thereon, thus effecting an economy by the reuse of old printing plates which are no longer needed.

The novelty and improvement of my invention, as an article of manufacture, chiefly reside in and are due to the use of the material described of which the plate or the surface thereof, is formed. Heretofore attempts have been made for producing printing plates of celluloid from half-tone and other plates by forming a matrix of celluloid or of hard rubber or of lead, pressing a plate of celluloid into the matrix and printing from the celluloid plate thus obtained. Apart from the difficulties in getting satisfactory and commercial results from any of these processes, certain inherent disadvantages in the use of celluloid as a material for printing plates, overcome by my invention, should be noted. Celluloid is inflammable, has a tendency to warp, because of the volatility of the camphor therein, and is not sufficiently refractory to enable a great number of copies to be printed therefrom. The printing plate produced as described herein on the contrary is non-inflammable as noted, will not warp, and is not subject to harmful change, physically or chemically after its final hardening, and, particularly, because of its refractory nature, will efficiently and clearly print many more copies than will plates made of celluloid or like substances. It also is cheaper to manufacture than celluloid printing plates.

The best known processes in use in the printing art, of making printing plates, are the electro-plate process and the stereotype process, in both of which the plates are made of metal, and in the first of which the process is slow and expensive. This is particularly true when plates are to be made for fine work, such as book and magazine work, because of the necessity of building up the plates in order to get uniform thickness of plate and thereby secure a uniform impression over the entire page. Also, the stereotype process is only adapted for doing rough work. By my invention a durable plate, capable of being used in fine work, is produced much more simply and cheaply, and without the necessity of building up the plates.

The composition which I prefer to use, for either the whole plate or the surface layer, as stated, may be that described in my Patents Nos. 1,020,593, March 19, 1912, 1,043,420, December 3, 1912, 1,020,594, March 19, 1912, or Reissue 13,531, February 11, 1913, (original Patent No. 1,046,137, December 3, 1912,) in all of which an infusible composition which is plastic when heated is described. Phenolic condensation products which are infusible and insoluble are also described in patents of L. H. Baekeland, Nos. 942,699 and 942,809, December 7, 1909. The product formed in accordance with these latter patents, however, cannot be softened by heat, when once formed in its final infusible state, to permit the taking of impressions under any practical pressures and therefore the impression must be taken before the final infusible state is reached, and to my knowledge no one prior to myself has proposed the formation of printing plates from any phenolic condensation product or similar material.

As indicated above, the desired printing or embossing plate, in its simplest form, is formed by pressing a composition of the character referred to, while hot and plastic, against any suitable matrix, preferably the one described in my prior application referred to, Serial No. 579,585, and cooling while in contact therewith. By using the composition, and proceeding in the manner described, a working plate of excellent wearing and enduring qualities is formed, which takes ink well, is not corroded thereby, is not affected by any of the cleaning agents used thereon, and may be kept for any period of time without corrosion or deterioration. A remarkably clear and exact impression is taken by the plate from the matrix, and retained in the use of the plate in printing, not only of type matter and the like, but also of the fine, sharp lines of a half-tone engraving. The advantages and properties referred to of my improved printing plate could in great measure not be foretold, but were determined by research and experiment.

In order that my invention may be more clearly understood, attention is hereby directed to the accompanying drawings, in which—

Figure 2:

Figure 1 is a transverse section through a suitable matrix in contact with a slab of material from which my improved printing plate is to be made. Fig. 2 is a similar view of the plate after being separated from the matrix; and Fig. 3 is a similar view of a composite plate having a body portion of fusible material.

The matrix 1 is formed as the negative of a half-tone, photo-engraving, electrotype, block of type, or other object in relief or intaglio to be copied. The printing plate 2 is formed therefrom by pressing a slab of the composition of which the plate is to be formed, in hot, plastic, condition, against the matrix, cooling the plate in contact with the matrix, and removing the same. As stated, the preferred printing plate or surface composition should be a condensation product of the kind which is infusible but plastic when heated, as described in my patents referred to. The plate of infusible material should be one which becomes sufficiently plastic to take the impression of the matrix at relatively low temperatures, as will be further explained hereafter. Sufficient plasticity may be obtained with a composition of the character described by heating the plate 2 to a heat of approximately from 212° F. to 320° F. according to the pressure found necessary. With the composition described heated as indicated a moderate pressure will be sufficient to form the desired impression on plate 2.

Figure 3:
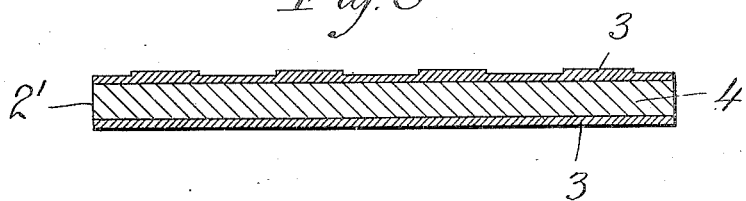

In Fig. 3 the printing plate 2' is formed with surface layers 3, 3 on both faces thereof, formed of the hot-plastic infusible composition described, and with a body portion 4, which as stated is permanently fusible when heated. This body portion should have a considerable proportion of an inert filler mixed therein, as from 100 to 300 per cent. by weight of the cresol or phenol resin or other fusible binder used. The filler may be wood flour, or other fibrous or inert powdered material. The provision of surface layers on both faces of the plate is of advantage as stated in equalizing stresses, etc. The surface layers will be cemented to the body portion by the heat and pressure used.

The composition of which the printing plate or surface layer is formed may be, as stated in my Patents Nos. 1,020,593 and 1,046,420 referred to, made by combining a fusible soluble phenol-formaldehyde condensation product, termed by me a phenol resin, with from 7.6 to 12 parts by weight of hexa-methylene-tetra-amin, at a sufficient temperature, as 220° F. to form a final, hard infusible, product. Or, in place of hexa-methylene-tetra-amin a paraformaldehyde, such as tri-oxy-methylene, in the proportion of from 5 to 7½ per cent. of the weight of the phenol resin may be used. In either case a solid solvent or plasticity ingredient is incorporated in the composition, such as a chloro or nitro derivative of naphthalene, benzoic, phthalic or stearic acid or anhydrid or other agents described in the patents referred to. Or the plasticity agent may be a halogen substitution derivative of a phenol, such as the higher chlorin substitution products of phenol, as disclosed in my Reissue Patent No. 13,531. The plasticity or solid solvent ingredient remains in the final infusible product formed, as stated in my said patents, apparently in solid solution therewith. Preferably the plasticity agent should be used in proportions from 5 to 25 per cent. of the phenol resin by weight, in order that the composition formed should be sufficiently plastic at relatively low temperatures, and a fibrous or inert powdered filler, such as wood pulp, asbestos, cotton flock, or other fillers known or mentioned in my patents referred to, should be used in the proportion of from 20 to 50 per cent. of the phenol resin, when the whole plate is made of the composition.

It is not absolutely essential that the composition be prepared in the manner referred to. It may be formed by other suitable methods, to include a solid solvent or plasticity agent such as described, so as to have the property of being hard and infusible but sufficiently plastic when heated to take the desired impression, under moderate and practicable pressures. Or instead of using the final infusible hot-plastic materials described, a fusible mass or mixture of fusible ingredients which is or are transformed by chemical reaction upon the application of sufficient heat to form an infusible phenol methylene condensation product, may be used. In this case a plate or slab of such a composition, such as a mixture of the phenol resin, methylene-containing hardening agent and preferably a solid solvent ingredient, all as described above, and of the required dimensions, may be heated to 212° F. or higher, and then pressed while hot against any desired matrix, and the heat then raised to the reaction temperature of the reacting ingredients until the hardening reaction is complete. The plate should then be cooled while in contact with the matrix and removed. Such a process as that just referred to, however, is subject to practical difficulties, such as the danger of sticking of the molded plate to the mold after its formation, and the preferred method, of employing a hard infusible product which is plastic when hot, but is not changed chemically by the heat necessary for molding, and pressing the same while hot against the mold, is deemed much more effective and practical.

In addition to the use of my improved plate for printing purposes, the same may be adapted for use as a permanent and pleasing replica or pictorial copy of the engraving, print or other object reproduced in the mold. For this purpose suitable coloring matter may be rubbed over the molded surface of the plate, and the depressed portions thus filled in with the desired colors, preferably a pigment which contrasts with the color of the composition. The surface of the plate is then ground slightly to remove the coloring matter from the high points, and the plate varnished with a transparent protecting varnish, such as collodion, cellulose acetate or copal or a solution of phenol resin in alcohol. While my invention is directed chiefly to the production of plates for printing or embossing, it may be considered broadly to include the production of the replicas described as well.

It is especially worthy of note in my improved printing plate that the fine delicate lines or points and sharp angularities of surface of an engraving, half-tone, set-type or other surface to be copied are reproduced clear and unmarred after a long period of use of the plate in printing. These superior attributes of a plate of the material described were discovered by me as the result of experimentation.

Having now described my invention, what I claim and desire to protect by Letters Patent is as follows:

1. A printing or embossing plate comprising a hard, infusible insoluble phenolic condensation product containing a plasticity ingredient, the said plate having formed upon its surface a representation in relief or intaglio of a print, engraving, half-tone, type matter or the like to be reproduced by printing or embossing therefrom, substantially as described.

2. A printing or embossing plate, the working face of which is formed of a composition comprising a phenol-methylene condensation product and a plasticity ingredient, associated therewith, which composition is hard and infusible, but softens under application of heat sufficiently to permit an impression to be formed thereon by a die or mold, the said plate having formed upon its working face a representation in relief or intaglio of a print, engraving, halftone, type matter or the like to be reproduced by printing or embossing therefrom, substantially as described.

3. A plate the face of which is formed of a composition comprising a solid solution of a phenol-methylene condensation product and a plasticity ingredient, which composition is hard and infusible, but softens under application of heat sufficiently to permit an impression to be formed thereon by a die or mold, the said plate having formed upon its said face a representation in relief or intaglio of a print, engraving, half-tone, type matter or the like, substantially as described.

4. A printing or embossing plate the working face of which is formed of a composition comprising a hard, infusible condensation product of a phenol and a methylene-containing body, the said plate having formed upon its working surface a representation in relief or intaglio of a print, engraving, half-tone, type matter or the like, to be reproduced by printing or embossing therefrom, substantially as described.

5. A plate having a face and body portion, the face portion of which is formed of a composition comprising a hard, infusible condensation product of a phenol and a methylene-containing body, and the body portion of which is formed of a fusible composition, the said plate having formed upon the surface of its face portion a representation in relief or intaglio of a print, engraving, half-tone, type matter or the like, substantially as described.

6. A printing or embossing plate having a face and body portion, the face portion of which is formed of a composition comprising a phenol condensation product associated with a plasticity ingredient, which composition is hard and infusible, but softens under application of heat sufficiently to permit an impression to be formed thereon by a die or mold, and the body portion of which is formed of a fusible composition, the said plate having formed upon its working face a representation in relief or intaglio of a print, engraving, half-tone, type matter or the like to be reproduced by printing or embossing therefrom, substantially as described.

This specification signed and witnessed this 25th day of October, 1913.

JONAS W. AYLSWORTH.

Witnesses:
FREDERICK BACHMANN,
WILLIAM A. HARDY.